US012786266B2

(12) United States Patent
Grant

(10) Patent No.: US 12,786,266 B2
(45) Date of Patent: Nov. 3, 2026

(54) FRAMEWORK FOR APPLICATION OBSERVABILITY

(71) Applicant: Cisco Technology, Inc., San Jose, CA (US)

(72) Inventor: Clinton Grant, Artarmon (AU)

(73) Assignee: Cisco Technology, Inc., San Jose, CA (US)

( * ) Notice: Subject to any disclaimer, the term of this patent is extended or adjusted under 35 U.S.C. 154(b) by 150 days.

(21) Appl. No.: 18/244,066

(22) Filed: Sep. 8, 2023

(65) Prior Publication Data

US 2025/0086856 A1 Mar. 13, 2025

(51) Int. Cl.

*H04L 67/10* (2022.01)
*G06F 3/04845* (2022.01)
*G06T 11/26* (2026.01)
*G06T 11/65* (2026.01)

(52) U.S. Cl.

CPC .......... *H04L 67/10* (2013.01); *G06F 3/04845* (2013.01); *G06T 11/26* (2026.01); *G06T 11/65* (2026.01); *G06F 2203/04806* (2013.01)

(58) Field of Classification Search

CPC ........ G06T 11/206; G06T 11/60; G06T 11/26; G06F 3/04845; G06F 2203/04806; G06F 3/0484; H04L 67/10

See application file for complete search history.

(56) References Cited

U.S. PATENT DOCUMENTS

| | | | | |
|---|---|---|---|---|
| 9,947,119 B2 | | 4/2018 | Grandhi et al. | |
| 10,984,048 B2 | | 4/2021 | Lo et al. | |
| 11,256,759 B1 | * | 2/2022 | Chen | G06F 16/9027 |
| 12,489,771 B1 | * | 12/2025 | Erlingsson | G06F 9/5072 |
| 2009/0115785 A1 | * | 5/2009 | Grandhi | G06T 11/206 345/440 |
| 2019/0377759 A1 | | 12/2019 | Lo et al. | |
| 2020/0012488 A1 | * | 1/2020 | Koval | G06F 8/71 |
| 2020/0271774 A1 | * | 8/2020 | Morello | G01S 13/89 |
| 2020/0401648 A1 | | 12/2020 | Kol et al. | |
| 2021/0203567 A1 | * | 7/2021 | Hoopes | H04L 43/045 |
| 2022/0104079 A1 | * | 3/2022 | Karapantelakis | H04W 36/0072 |
| 2023/0093439 A1 | | 3/2023 | Thangeswaran | |
| 2023/0136048 A1 | * | 5/2023 | Doshi | G06F 9/5038 718/102 |

FOREIGN PATENT DOCUMENTS

JP 2004185553 A 7/2004

OTHER PUBLICATIONS

Stein, et al., "Spatial data structures for accelerated 3D visibility computation to enable large model visualization on the web", Web3D '14: Proceedings of the 19th International ACM Conference on 3D Web Technologies, Aug. 2014, pp. 53-61.

(Continued)

*Primary Examiner* — Jeffery A Brier

(74) *Attorney, Agent, or Firm* — Lee & Hayes, P.C.

(57) ABSTRACT

In one implementation, a method herein comprises: identifying, by a device, compute nodes for a distributed application and services executed by the distributed application; identifying, by the device, inter-process connections between the services; generating, by the device, a graph with the inter-process connections as edges of the graph; and providing, by the device, the graph for display.

20 Claims, 12 Drawing Sheets

(56) References Cited

OTHER PUBLICATIONS

"OpenNMS—Open Source Network Monitoring Platform", online: https://www.opennms.com/, accessed Sep. 8, 2023, 2 pages.
"Network Topology Mapper", online: https://www.solarwinds.com/network-topology-mapper, accessed Sep. 8, 2023, 3 pages.
"Introducing the Datadog Service Map", online: https://www.youtube.com/watch?v=QbIG_eXStdw, accessed Sep. 8, 2023, 3 pages.
Williams, Dan, "Layouts for large network visualization", online: https://cambridge-intelligence.com/large-network-visualization/, accessed Sep. 8, 2023, 11 pages.
Williams, Dan, "Graph visualization: dealing with starbursts", online: https://cambridge-intelligence.com/dealing-with-starbursts/, accessed Sep. 8, 2023, 8 pages.

* cited by examiner

FRAMEWORK FOR APPLICATION OBSERVABILITY

TECHNICAL FIELD

The present disclosure relates generally to computer systems, and, more particularly, to a framework for application observability.

BACKGROUND

Application service inspection, or "observability," is often used today to provide insights into applications, which can be defined by a number of processes and/or services (e.g., daemons, etc.) and inter-process communication (IPC) connections between these processes. An example of an application and IPC connections corresponding thereto can be an IOS-XE operating system (available from Cisco Systems Inc.) of a Switch, Router and/or Wireless controller, although other examples are possible. In order to visualize the insights provided from application service inspection, visualization tools, such as a user interface (UI) or Web UI may be provided.

Unfortunately, these visualization tools are difficult to scale. For example, current visualization tools may provide limited functions to allow a user to drill down on the processes, services, and/or IPC connections in the frontend UI, which can limit the scalability of the visualization tool. As a result, users of such visualization tools may have to click through to multiple pages, often times with multiple tabs, to look at a table that may contain relevant observability information. This necessitates users to invest significant time and effort in running and managing these visualization tools. Increasingly, users do not have the time and/or expertise for this type of investment, which can lead to neglecting application service inspection, which can, in turn, lead to increased time to issue resolution, degraded product and network performance, and increased wasting of computational resources.

BRIEF DESCRIPTION OF THE DRAWINGS

The implementations herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more implementations of the disclosure, techniques are introduced herein that provide a framework for application observability. The method may comprise: identifying, by a device, compute nodes for a distributed application and services executed by the distributed application; identifying, by the device, inter-process connections between the services; generating, by the device, a graph with the inter-process connections as edges of the graph; and providing, by the device, the graph for display.

Other implementations are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
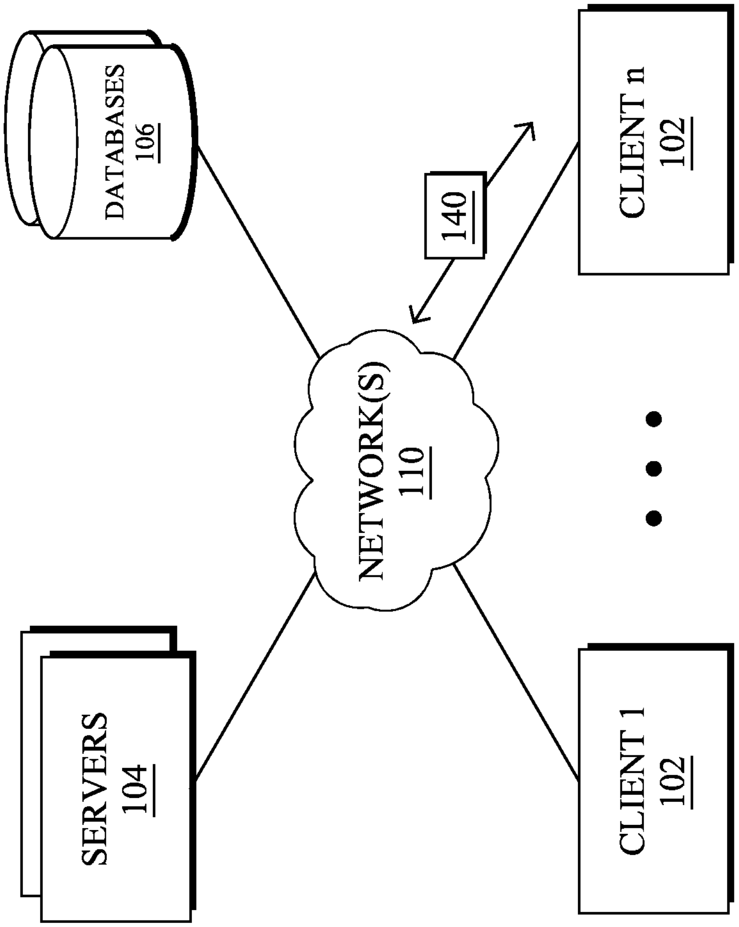
FIG. 1 illustrates an example computer network.

FIG. 1 is a schematic block diagram of an example simplified computing system 100 illustratively comprising any number of the client devices 102 (e.g., a first through nth client device), one or more of servers 104, and one or more of databases 106, where the devices may be in communication with one another via any number of networks (e.g., networks 110). The one or more networks (e.g., networks 110) may include, as would be appreciated, any number of specialized networking devices such as routers, switches, access points, etc., interconnected via wired and/or wireless connections. For example, devices 102-104 and/or the intermediary devices in network(s) (e.g., networks 110) may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) (e.g., networks 110).

Notably, in some implementations, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in simplified computing system 100, and that the view shown herein is for simplicity. Also, those skilled in the art will further understand that while the network is shown in a certain orientation, the simplified computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
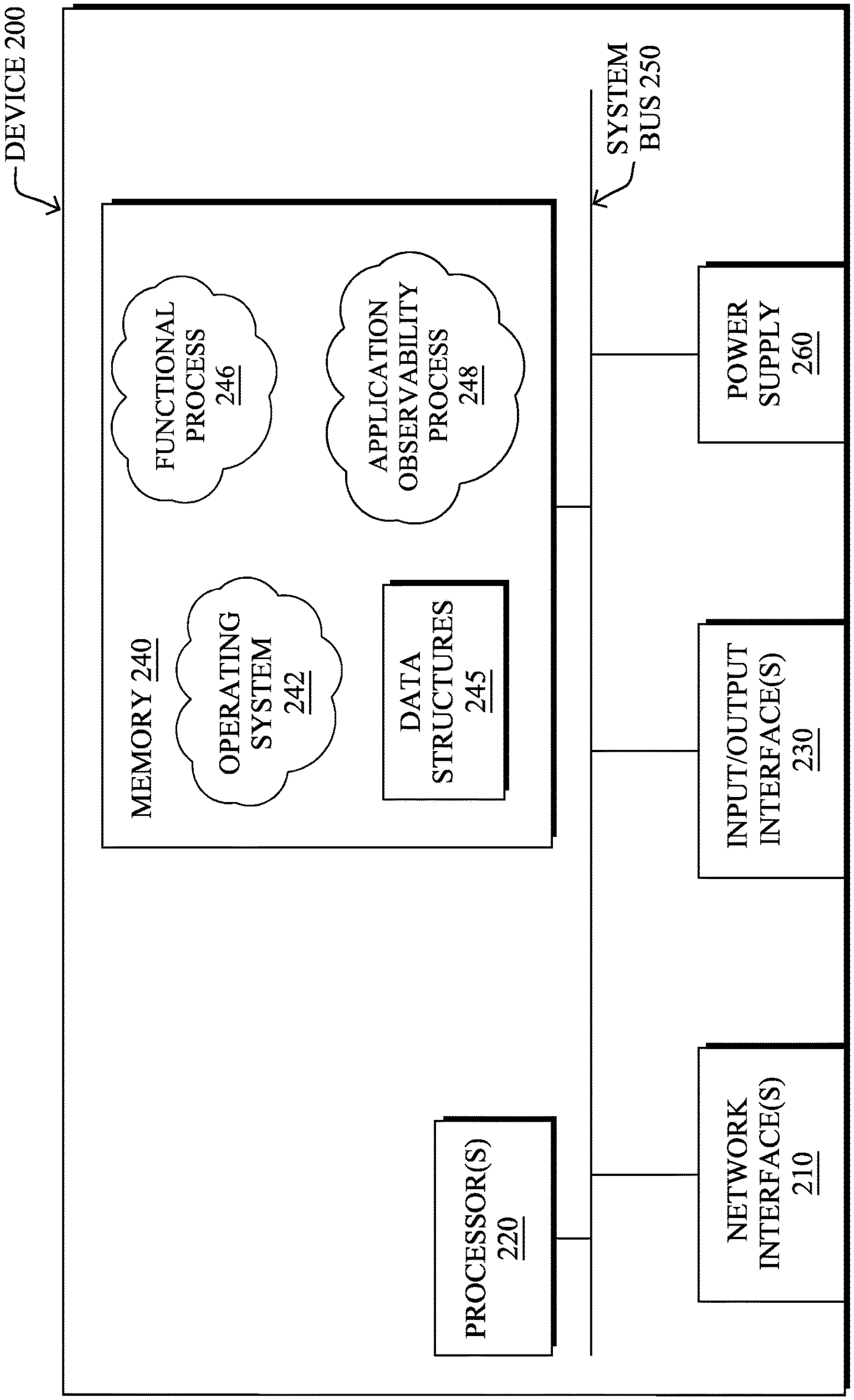
FIG. 2 illustrates an example computing device/node.

FIG. 2 is a schematic block diagram of an example node/device 200 that may be used with one or more implementations described herein, e.g., as any of the devices 102-106 shown in FIG. 1 above. Device 200 may comprise one or more network interfaces (e.g., network interfaces 210) (e.g., wired, wireless, etc.), at least one processor (e.g., processor 220), and a memory 240 interconnected by a system bus 250, as well as a power supply 260 (e.g., battery, plug-in, etc.).

The network interface(s) (e.g., network interfaces 210) contain the mechanical, electrical, and signaling circuitry for communicating data over links coupled to the network(s) (e.g., networks 110). The network interfaces may be configured to transmit and/or receive data using a variety of different communication protocols. Note, further, that device 200 may have multiple types of network connections via network interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the implementations described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more of functional processes 246, and on certain devices, an illustrative "application observability" process (e.g., application observability process 248), as described herein. Notably, functional processes 246, when executed by processor(s) (e.g., processor 220), cause each particular device (e.g., device 200) to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Observability Intelligence Platform—

Distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more implementations herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable implementation of categorical classification.

Figure 3:
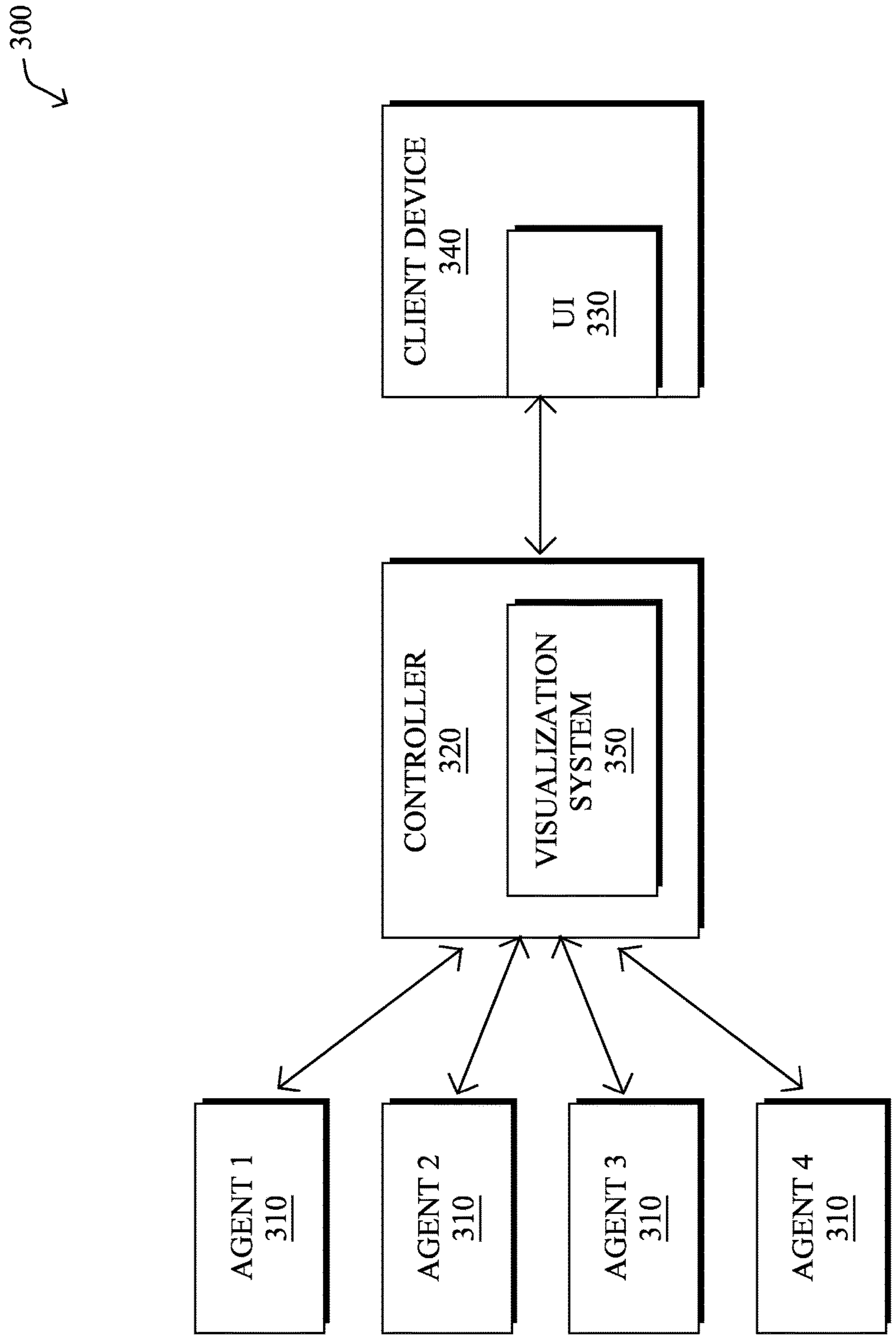
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more of agents 310 and one or more servers/controllers (e.g., controller 320). Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller(s) (e.g., controller 320) as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page—e.g., load a shopping website, log in, search for an item, add it to the shopping cart, etc.).

The controller 320 is the central processing and administration server for the observability intelligence platform. The controller 320 may serve a browser-based user interface (UI) (e.g., interface 330) that is the primary interface for monitoring, analyzing, and troubleshooting the monitored environment. Specifically, the controller 320 can receive data from agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance (e.g., controller 320) may be hosted remotely by a provider of the observability intelligence platform 300. In an illustrative on-premises (On-Prem) implementation, a controller instance (e.g., controller 320) may be installed locally and self-administered.

Controllers 320 receive data from different agents (e.g., Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain implementations, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one implementation, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain implementations, the observability intelligence platform may use both self-learned baselines and configurable thresholds to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the extensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

—Framework For Application Observability—

As noted above, scalability in observability frameworks can be difficult to achieve, particularly as the quantity of applications, processes, and/or IPC connections in a network continues to grow. For example, the IOS-XE enterprise operating system has over one hundred and ten Linux processes, and over three hundred and fifty IPC connections between these processes, and these numbers are likely further increase in the future. One reason for the scalability problem in observability frameworks is that many current approaches attempt to provide visualizations of nodes and/or IPC edges in the frontend UI. Further, many current approaches can be cumbersome to navigate due to their reliance on multiple pages, often times with multiple tabs per page, that a user must navigate in order to eventually to find observability information displayed in an unwieldy table format.

The techniques herein provide for a framework for application observability (e.g., application service inspection) involves a highly scalable (e.g., essentially "infinite") framework for observing and inspecting applications in aid of troubleshooting and monitoring. As described in more detail herein, aspects of the present disclosure operate by providing and end-to-end (e.g., browser to backend) service for displaying the processes and IPC connections of applications that might be distributed across multiple compute nodes. It is noted that implementations herein apply equally to enterprise operating system (e.g., IOS-XE, etc.) based applications as well to cloud based and/or hosted applications that span many compute nodes. In an enterprise deployment, router/switch/wireless controller to compute nodes can be the line cards: route processors (RP), forwarding processors (FP), and interface cards (CCs). In a cloud hosted application, the compute nodes can be the virtual machines or Linux containers that are spawned.

In some implementations, the disclosure provides a framework that allows a web UI user to drill down further into the services, using spatial indexing to achieve the scale. Drilling down can also be described as "zooming in" through different "layers" that reveal progressively more detail regarding applications that are being observed. The key to scaling is to layout the graph of service nodes and IPC edges at the backend. As mentioned above, currently most visualization tools attempt to do this in the frontend UI, limiting the scalability of the observability framework.

In contrast, the framework disclosed herein is more intuitive in terms of usability and/or user experience, at least because the user doesn't have to click through to multiple pages (which often include with multiple tabs) to view observability information in a table. In contrast, implementations herein allow for all navigation to be contained on a single page that can be zoomed in to discover more information. The information to be revealed about a process can start with memory and CPU utilization and can extend to IPC message counters and/or database access counters, among other types of information. In some implementations, these artifacts can be searchable within each of the zoom layers.

Accordingly, aspects of the present disclosure seek to address various shortcoming in previous approaches by allowing for multiple layouts of a graph to be generated. These graph layouts can be generated using different layout algorithms, which, as mentioned above may be applied in the backend. In addition, implementations herein allow for a user (e.g., a user viewing the graph(s) on a UI, such as a web UI) to have the option to switch between various views of the graph(s) and/or layouts of the graph(s). As mentioned above, providing these features using current observability frameworks would be computationally costly, perhaps even prohibitively so.

In various implementations, a seamless zoom capability is provided to graph visualization in an observability framework by using spatial indexing techniques. For example, aspects of the disclosure allow for thirty-two or more layers or view, which can provide a user experience (UX) that enables the user to stay on a single page and reveal or hide information as they zoom in or zoom out of the graph(s). Stated alternatively, implementations herein allow for a user to seamlessly zoom in or zoom out, thereby seamlessly transitioning between various views (which may include complex views) of a graph within a single page (or "window") of a UI, such as a web UI.

As described in more detail herein, the various layers of views that can be manipulated within a single page (or "window") of a UI can, in accordance with the disclosure, include, at minimum:

A first layer or "data center view" that shows, on a geographic map, indications of where various applications are hosted.

A second layer that can display a "layout distribution" of compute nodes hosting the various applications.

A third layer that visualizes or "reveals" processes and/or services associated with the compute nodes.

Other layers and zoom capabilities are described in more detail below. However, it is noted that the scale for these and other views contemplated by the disclosure can allow for upwards of ten thousand objects or more to be provided in a web UI view, which is vastly more than can be achieved by solutions that attempt to layout and render solely in the browser. Further, the graph layout options disclosed herein can include multiple graph layout options, which can be generated at the backend, thereby offering a user different views of the same topology to assist with troubleshooting issues that may arise in a computing network. For example, force-directed layouts, radial layouts, tree layouts, and/or circle packing layouts, among other graph layouts, can be generated individually or simultaneously in the backend, allowing a user of the UI (e.g., a web UI) to switch between such layouts in a web browser to easily view different perspectives of the graph(s) to assist with troubleshooting issues that may arise in a computing network.

Illustratively, the techniques described herein may be performed by hardware, software, and/or firmware, such as in accordance with application observability process 248, which may include computer executable instructions executed by the processor 220 (or independent processor of network interfaces 210) to perform functions relating to the techniques described herein.

Specifically, according to various implementations, an illustrative method herein may comprise: identifying, by a device, compute nodes for a distributed application and services executed by the distributed application; identifying, by the device, inter-process connections between the services; generating, by the device, a graph with the inter-process connections as edges of the graph; and providing, by the device, the graph for display.

Figure 4:
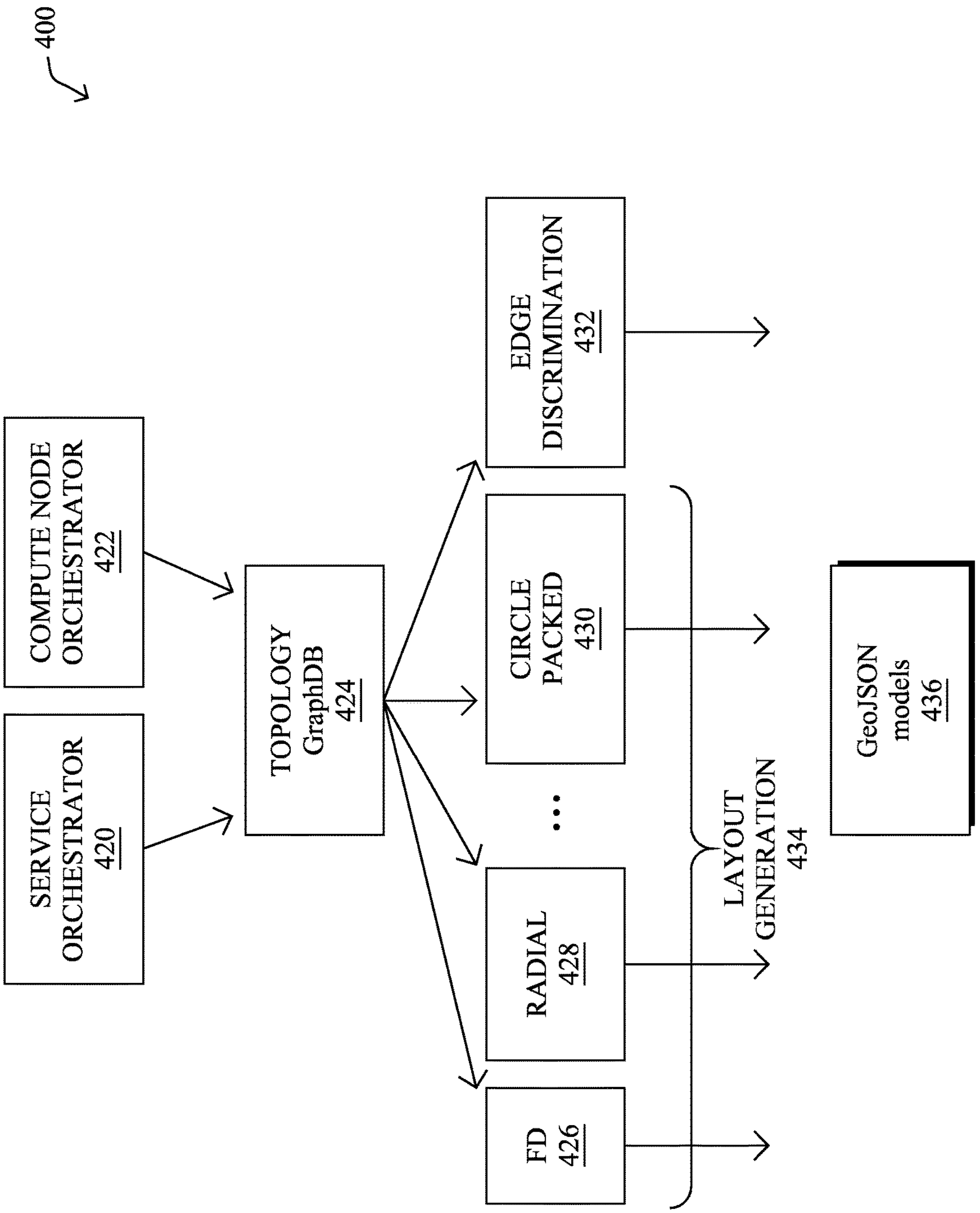
FIG. 4 illustrates an example of a workflow to generate graph layouts in accordance with the disclosure.

Operationally and according to various implementations, FIG. 4 illustrates an example of a workflow 400 to generate graph layouts in accordance with the disclosure. As shown in FIG. 4, a service orchestrator 420 and a compute node orchestrator 422 gather and generate information corresponding the services and compute nodes in a network. This information is provided to a topology graph database service 424.

The information provided to a topology graph database service 424 can be used as part of layout generation 434. It is noted that the topology graph database service 424 can be provided as a backend service in accordance with one implementation of the disclosure. For example, at operation 426, force-directed graph layouts may be generated as needed from the information provided to the topology graph database service 424. In addition, at operation 428, radial graph layouts may be generated as needed from the information provided to a topology graph database service 424. Further, at operation 430 circle packed graph layouts may be generated as needed from the information provided to a topology graph database service 424. It will be appreciated that other types of graph layouts, such as tree graph layouts, among other graph layouts, may be generated as part of layout generation 434.

In addition, at operation 432, edge discrimination techniques can be performed from the information provided to the topology graph database service 424. As will be appreciated, the edge discrimination techniques performed at operation 432 can include execution of various machine learning techniques in addition to, or in the alternative, to traditional edge discrimination techniques. Further, in some embodiments, the edge discrimination techniques can include discriminating between IPC(s) that span one or more compute nodes and/or IPC(s) between services within the same compute node.

In some implementations, as shown in FIG. 4, the graph layouts generated as part of the layout generation 434 in addition to the edge discrimination information obtained by performance of operation 432 can be used to generate one or more graph layouts (e.g., models) for display on a UI (e.g., a web UI) at operation 436. In at least one implementation, the graph layouts at operation 436 can be generated in GeoJSON format. That is, the portion of the layout to be visualized (e.g., in the browser or web UI) can be generated in the GeoJSON format. As will be appreciated, the GeoJSON format describes the vector line features to be drawn in a browser such as lines, line strings, and circles, along with a coordinate reference system. Each of these vector features can have a coordinate value (e.g., a longitude and latitude) for a specific coordinate reference system. In some implementations, the GeoJSON format can be consumed by libraries such as OpenLayers that can run in the browser.

In various implementations, the model obtained at operation 436 describes a graph of all the "possible" processes and all possible IPC connections between these processes. For example, an IOS-XE system may have an existing platform description model that is generated at build time to define one or more the relationships between the IPC connections and the processes. It is noted that some systems may only provide a subset of the processes enabled depending on the features that are configured; however, the operations performed in FIG. 4 may be used in such cases to define the relationships between the IPC connections and the processes.

In general, as processes are started, or stopped (e.g., as configuration changes occur in a network), the graphs layouts may be recomputed in accordance with the disclosure. A specific example of starting of a process may be the online insertion and removal (OIR) of a line card (LC) in a modular network device, such as a router of a switch system. In this example, upon insertion of the LC the LC process instances may be represented. However, in practice, this may happen infrequently, thereby allowing the layout topology to stabilize, and therefore allow support of rendering the graph layouts in the backend. In principle this may take a second or two depending on the layout algorithm.

In some implementations, the service orchestrator 420 and/or the compute node orchestrator 422 (referred to collectively herein as an "orchestration service") may co-exist with the application. The service orchestrator 420 and/or the compute node orchestrator 422 may be aware of all the compute nodes in the system and/or the state of all the processes running on those compute nodes. When the service orchestrator 420 and/or the compute node orchestrator 422 detects changes in the configuration, the graph layout may be regenerated. For a router and/or switch, the route processor (RP) field-replaceable unit (FRU) may have knowledge of the number of LCs and forwarding processors (FPs), and also may have knowledge of the services associated with each of these cards (LCs and/or FPs). Further, in a cloud hosted application, there may be an orchestrator entity performing the functions of the service orchestrator 420 and/or the compute node orchestrator 422 that may have knowledge of the number of deployed compute nodes and the services running in each compute node.

In order to provide the scalability described herein with respect to the frontend (e.g., to the display of the graph(s) on a UI) the view-port coordinates of the viewable region (e.g., rectangle) displayed on the UI (e.g., displayed in a browser) can be signaled to the topology graph database service 424. The topology graph database service 424, which is described in further detail below, can maintain a quadtree (or other suitable) data structure for each layer. In some implementations, as the view zooms to a new layer, the rectangular coordinates are applied to the quadtree tree to search and return only those artifacts (e.g., lines and circles) that can be found within that rectangle (for the given layer). This can enable the backend to scale and only return the portion of the layout that is going to be seen in the UI (e.g., in the browser view).

As mentioned above, in some implementations, the portion of the layout to be visualized (e.g., in the browser or web UI) can be generated in the GeoJSON format. (As noted above, it will be appreciated that the GeoJSON format can be consumed by libraries such as OpenLayers that run in the browser.) The browser library can assist in rendering the lines and circles with different styles based, at least in part, on the object type to be displayed. The vector nature of these formats and corresponding libraries allows true scale where it is possible to have upwards of ten thousand objects in any given view. Further, as described in more detail herein, additional clarity can be achieved by distinguishing between inter-node and intra-node IPC connections. For example, when the layout is generated, such links can be labelled in the GeoJSON code. This can allow these links to be added and/or removed in the web UI view selectively to allow a user to de-clutter the view. These features can be especially beneficial when there is a complex graph that creates a "hairball", for example.

In order to elucidate various aspects of the disclosure, a non-limiting example of an algorithm to generate one or more layouts in accordance with the disclosure is provided below. In this non-limiting example, the layout may start with a Web Mercator coordinate system (e.g., the EPSG: 3857 coordinate system) and projection, although implementations are not so limited. It will be appreciated that the Web Mercator coordinate system and projection is commonly used for mapping web frameworks. The Web Mercator coordinate system and projection defines a Cartesian coordinate system (e.g., an x, y coordinate system) where the where x and y are easting and northing respectively and distances from the origin (e.g., a point (0,0) of the coordinate system) are measured in meters (m). For this coordinate system and projection, the origin is the intersection of the Greenwich meridian and the equator. As noted above, multiple steps of coordinate transformation may be involved during the layout generation.

Continuing with this non-limiting example, consider a blank canvas having an 800×600 pixel view. Next, the compute nodes of a network can be populated (e.g., laid out) on the canvas using a force directed (FD) algorithm (or other suitable algorithm) such that a compute node circle is ensured to provide proper node spacing. In some implementations, the compute nodes are populated to the canvas by the compute node orchestrator 422.

Figure 5:
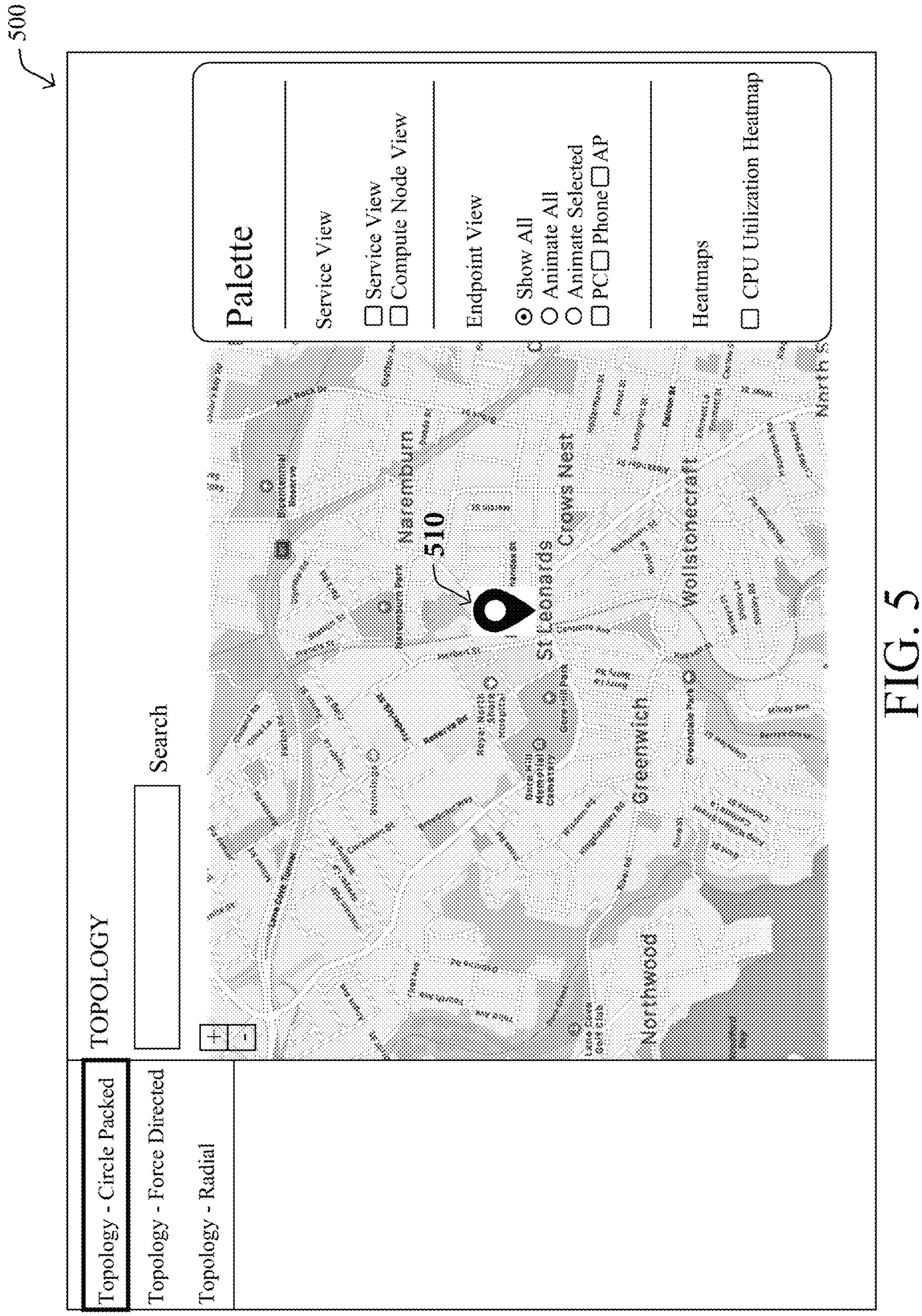
FIG. 5 illustrates an example geographical view in a web user interface of one or more datacenters.

Next, the coordinates of the compute node graph (which was populated onto the previously blank canvas) can be translated to the true longitude and latitude reference coordinates and provided in the browser (web UI) in a "street view" presentation, as shown in FIG. 5 (below).

Next, the compute node graph layout that was translated above to show the true longitude and latitude coordinates of the compute nodes can be rendered (for example, at operation 436) to a suitable format, such as GeoJSON.

In order to address the services within a given compute node, in this non-limiting example, the techniques herein consider a new blank canvas defined by the pixels within the compute node "circle" discussed above. Next, the desired layout algorithm is applied to the services for that node around the center of the view. In some implementations, application of the desired layout algorithm to the services for nodes is performed by the service orchestrator 420.

Continuing with this non-limiting example, the centroid and/or center-of-mass for the services of the given compute node can be calculated. In some implementations, the calculated centroid can become a service reference point.

Next, the (x, y) coordinates for each service circle and IPC line edge to the compute node center reference point are translated with the centroid of the service moved to the center of the compute node. These operations are then repeated for each compute node and the services within until all desired compute nodes and services are accounted for.

Next, the service graph layout, including IPC connections within the compute node(s) is rendered (for example, at operation 436) to a suitable format, such as GeoJSON. Finally, a GeoJSON mapping of the line strings for the IPC connections spanning one or more compute nodes can be generated for display in the browser or UI.

FIG. 5 illustrates an example geographical view in a web user interface 500 of one or more datacenters. The geographical view shown in FIG. 5 may be referred to as a first layer or "top level" of the framework described herein. In some implementations, at this "top level," because the framework of the disclosure leverages geo-spatial indexing, it is relatively simple to display a datacenter 510 (e.g., a performance optimized datacenter (POD)) location on a street map before zooming in, as shown in FIG. 5.

Figure 6A:
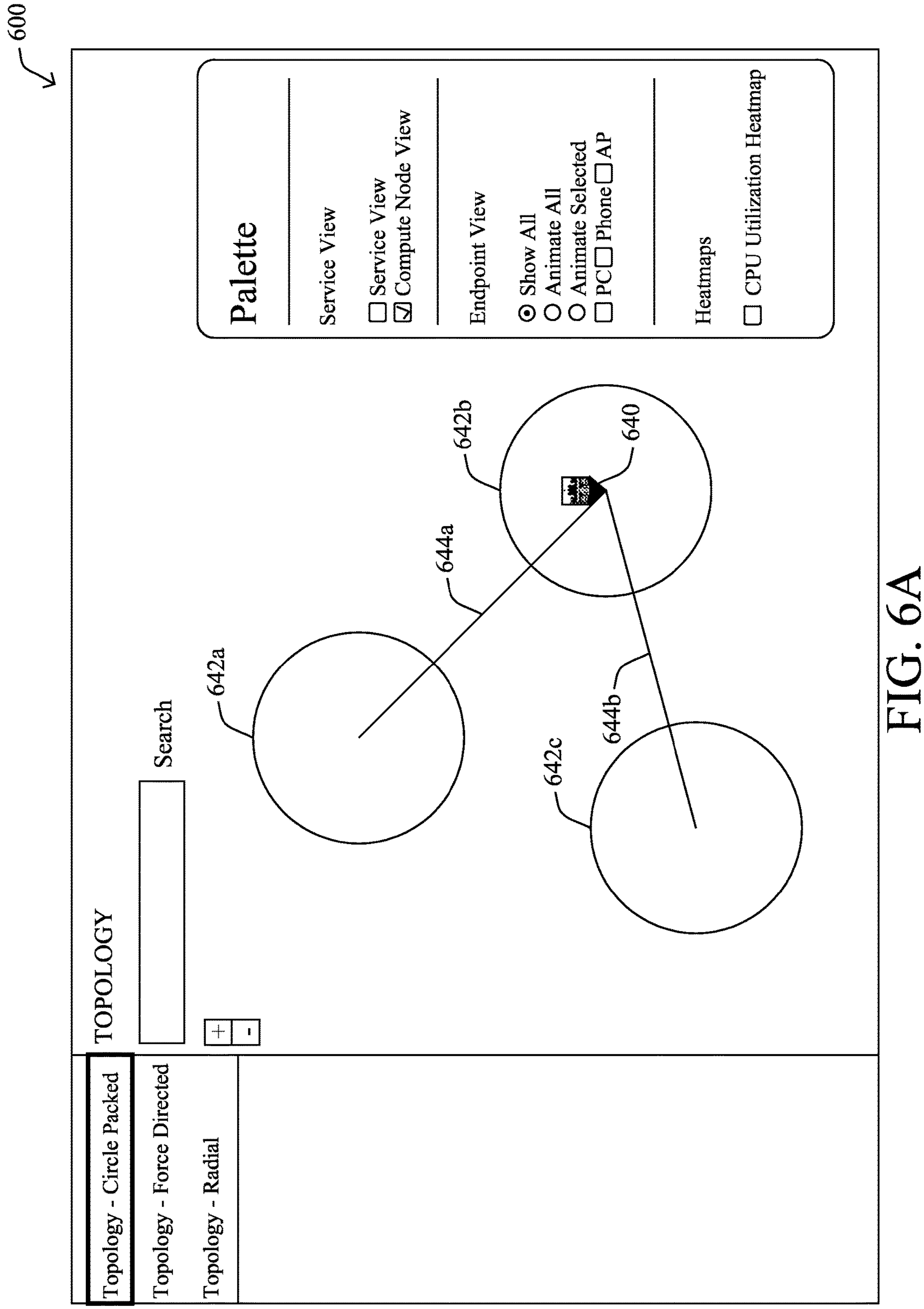
FIGS. 6A-6B illustrate examples of compute node view in a web user interface of a plurality of compute nodes.
Figure 6B:
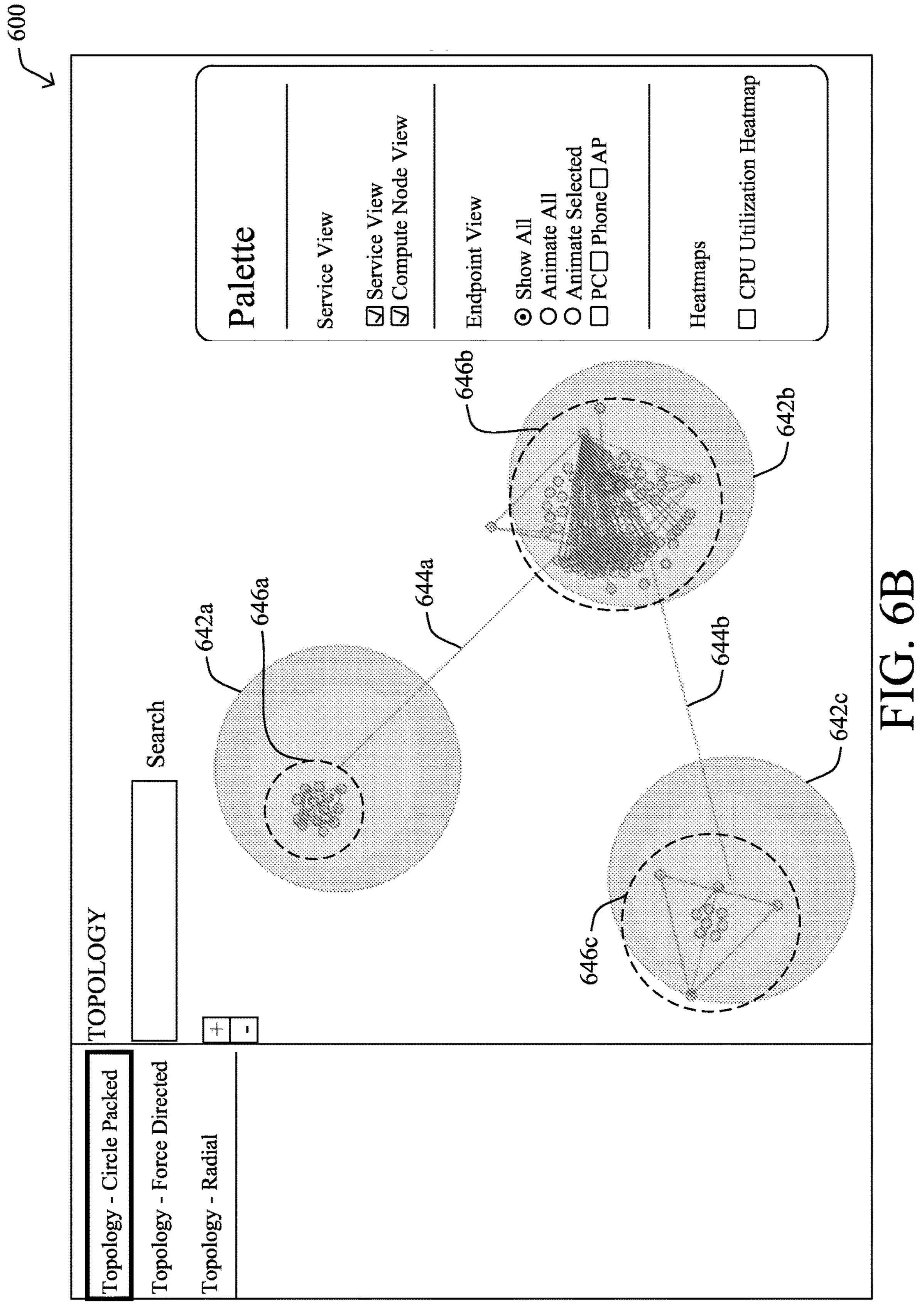

FIGS. 6A-6B illustrate examples of a compute node view in a web user interface 600. FIG. 6A illustrates an example compute node view in a web user interface 600 showing a plurality of compute nodes 642*a*, 642*b*, and 642*c*. The compute node view shown in FIG. 6A may be referred to as a second layer of the framework described herein. As shown in FIG. 6A, the web user interface 600 is, at this particular zoom level, showing a router 640 and three compute nodes (e.g., the plurality of compute nodes 642*a*, 642*b*, and 642*c*) or field-replaceable units (FRUs). In some implementations, the router 640 may be an IOS-XE router, although implementations are not so limited.

In FIG. 6A, IPC connections 644*a* and 644*b*, which can be many, are summarized by a single edge in the graph shown in the web user interface 600. Non-limiting examples of devices associated with the IPC connections can include route process (RP) cards, forwarding processors (FP), and/or line cards with interfaces (CC). In some implementations, both the CC and FP may connect to the RP.

FIG. 6B illustrates another example compute node view in a web user interface 600 showing a plurality of compute nodes 642*a*, 642*b*, and 642*c*. The compute node view shown in FIG. 6B may be referred to as a second layer of the framework described herein. As shown in FIG. 6B, the web user interface 600 is, at this particular zoom level, showing three compute nodes (the plurality of compute nodes 642_a_, 642_b_, and 642_c_) or field-replaceable units (FRUs). As shown in FIG. 6B, processes 646_a_, 646_b_, and 646_c_ are running on the plurality of compute nodes 642_a_, 642_b_, and 642_c_.

Figure 7:
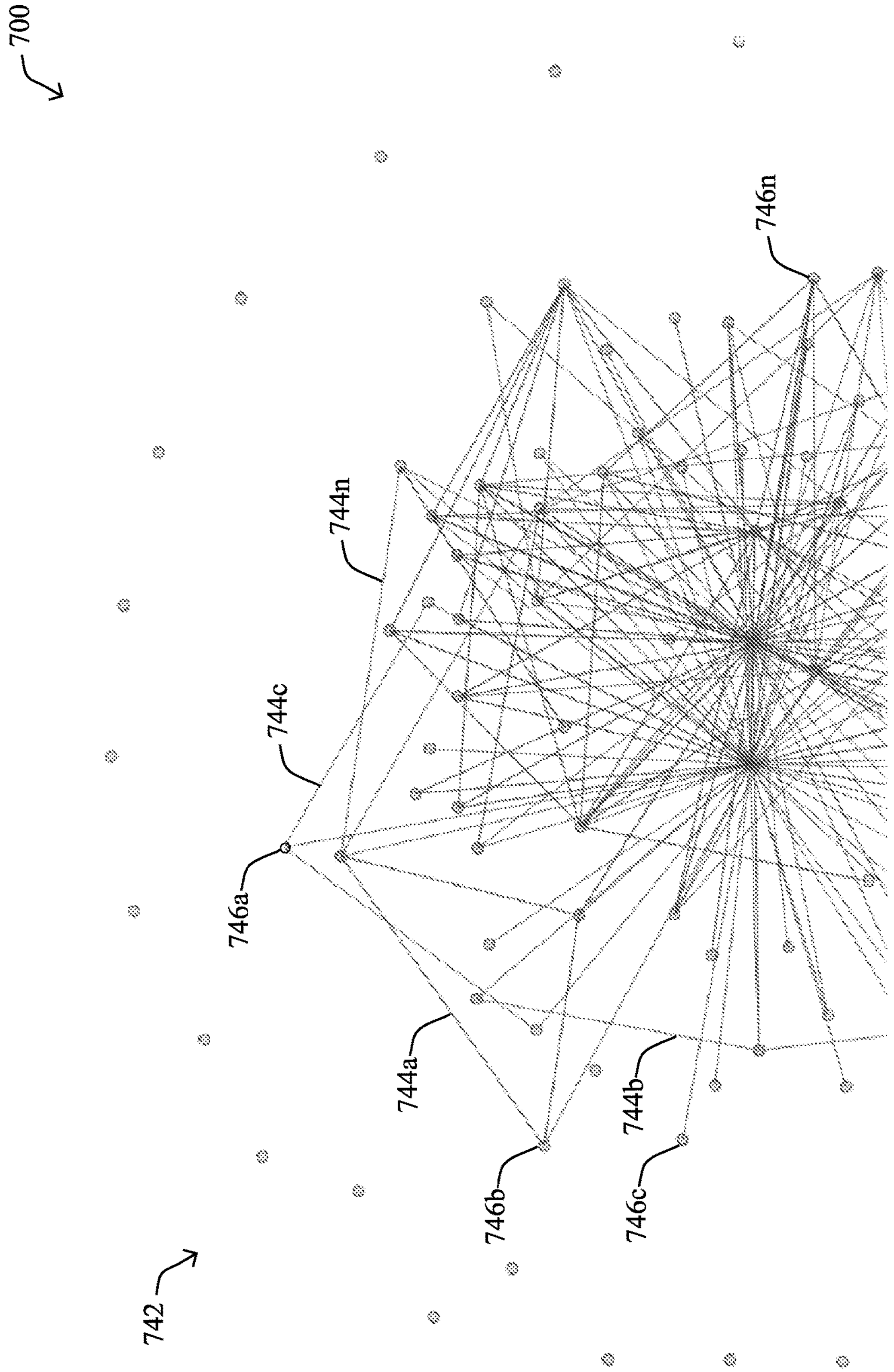
FIG. 7 illustrates an example application service graph view in a web user interface.

FIG. 7 illustrates an example application service graph view in a web user interface 700. The application service graph view shown in FIG. 7 may be referred to as a third layer of the framework described herein. In FIG. 7, a plurality of processes 746_a_, 746_b_, 746_c_, and 746_n_ are running in a single compute node 742 and are communicatively coupled via the IPC connections 744_a_, 744_b_, 744_c_, and 744_n_. The single compute node 742 may be analogous to one of the plurality of compute nodes 642_a_, 642_b_, and 642_c_ of FIGS. 6A-6B, while the IPC connections 744_a_, 744_b_, 744_c_, and 744_n_ can be analogous to the IPC connections 644_a_, 644_b_, and 644_c_ of FIGS. 6A-6B.

In one implementation, the plurality of processes 746_a_, 746_b_, 746_c_, and 746_n_ are running on an RP compute node (e.g., the single compute node 742) and, accordingly, FIG. 7 illustrates the view within the RP compute node, showing only those services in the RP and the IPC connections 744_a_, 744_b_, 744_c_, and 744_n_.

Figure 8:
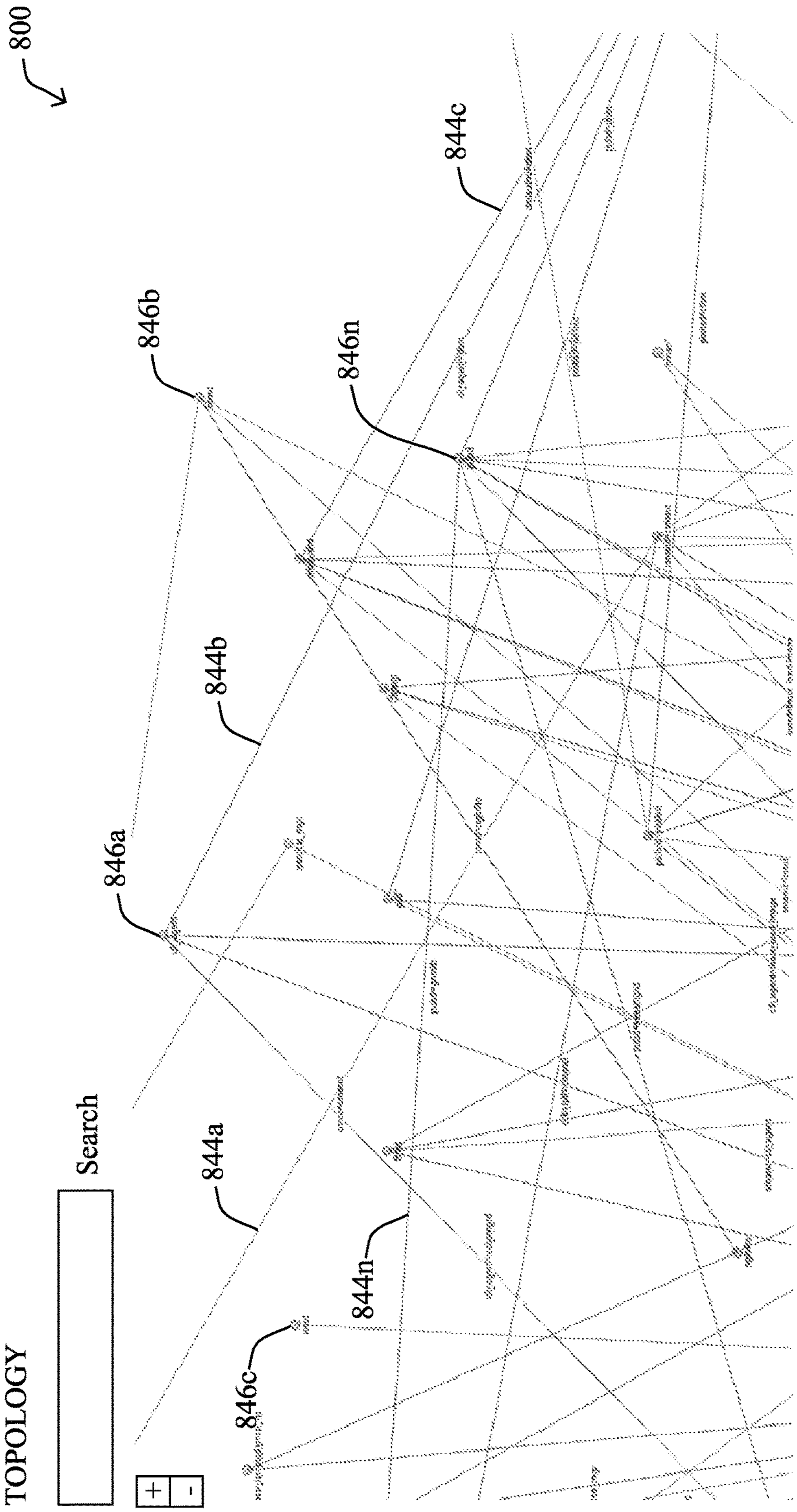
FIG. 8 illustrates an example text layer graph view in a web user interface showing a plurality of processes.

FIG. 8 illustrates an example text layer graph view in a web user interface 800 showing a plurality of processes 846_a_, 846_b_, 846_c_, . . . , 846_n_. The text layer graph view shown in FIG. 8 may be referred to as a fourth layer of the framework described herein. The processes 846_a_, 8466, 846_c_, . . . 846_n_ may be analogous to the processes 746_a_, 746_b_, 746_c_, 746_n_ of FIG. 7, while the IPC connections 844_a_ and 844_b_ can be analogous to the IPC connections 744_a_, 744_b_, 744_c_, and 744_n_ of FIG. 7.

At the level of zoom shown in FIG. 8, individual names of the plurality of processes 846_a_, 846_b_, 846_c_, . . . , 846_n_ in FIG. 8 can be viewed. Accordingly, the fourth layer of the framework can reveal the names of the plurality of processes 846_a_, 846_b_, 846_c_ . . . , 846_n_, as well as the IPC connections 844_a_, 844_b_, 844_c_, . . . , 844_n_.

Figure 9:
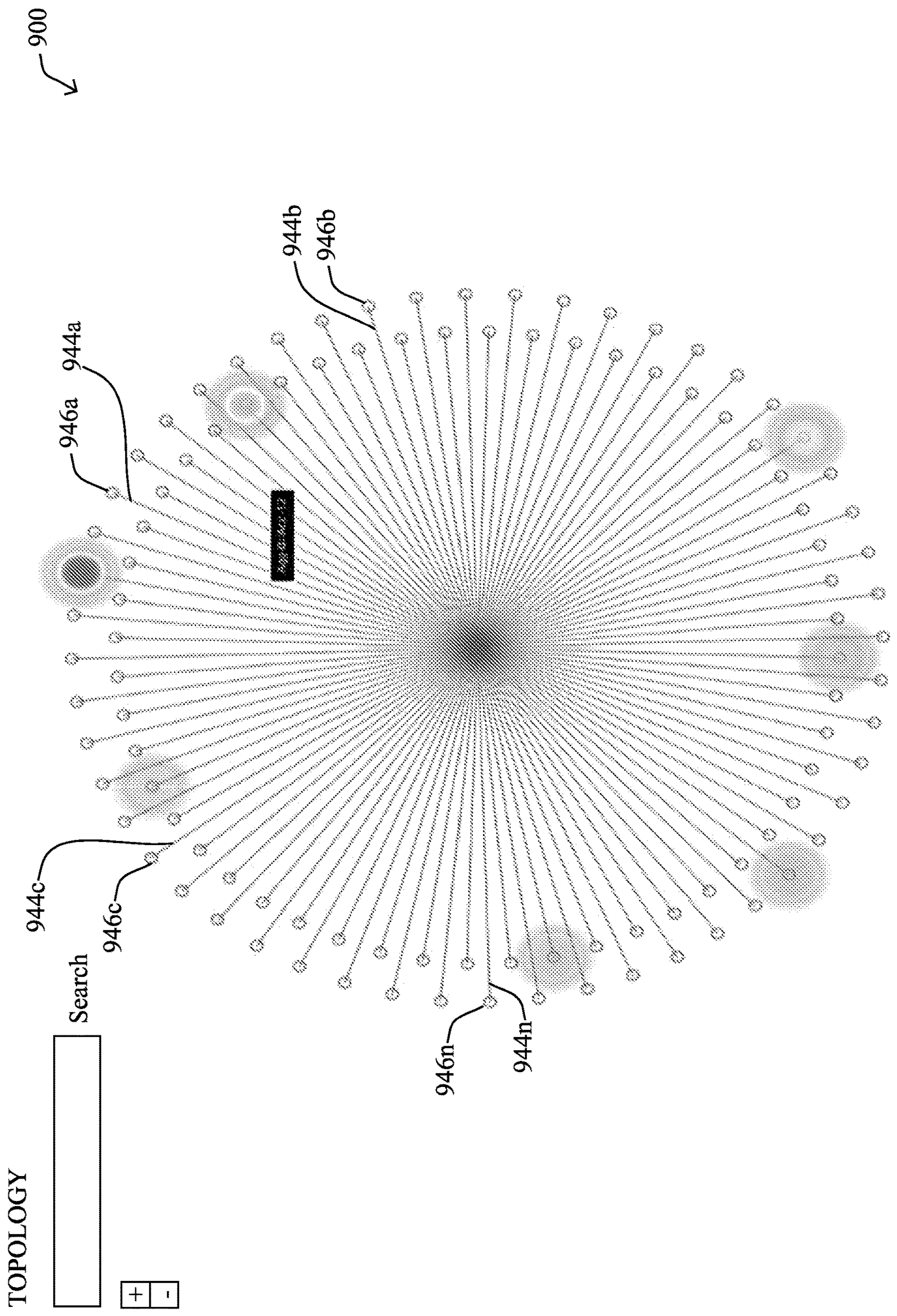
FIG. 9 illustrates an example heat map overlay in a web user interface.

FIG. 9 illustrates an example heat map overlay in a web user interface 900. Using information from the various generated graphs discussed above, it is also possible to overlay a heatmap layer encompassing the whole network and/or operating system. The heatmap overlay view can show various processes 946_a_, 946_b_, 946_c_, . . . , 946_n_, as well as the IPC connections 944_a_, 944_b_, 944_c_, . . . , 944_n_, which can be analogous to the plurality of processes 846_a_, 846_b_, 846_c_, . . . , 846_n_ and the IPC connections 844_a_, 844_b_, 844_c_, . . . , 844_n_ of FIG. 8.

As shown in FIG. 9, larger circles around the processes 946 can be indicative of greater resource consumption associated with a particular process of processes 946. In addition, although not shown in FIG. 9, various colors and/or color gradients can be used to indicate greater resource consumption associated with a particular process of processes 946. Accordingly, the heatmap overlay shown in FIG. 9 can allow a user of the web user interface 900 to visualize a summary of many different quantities about the application as a whole, for example, CPU utilization, memory utilization, and/or bandwidth consumption, among many other quantities that can affect the application.

Figure 10:
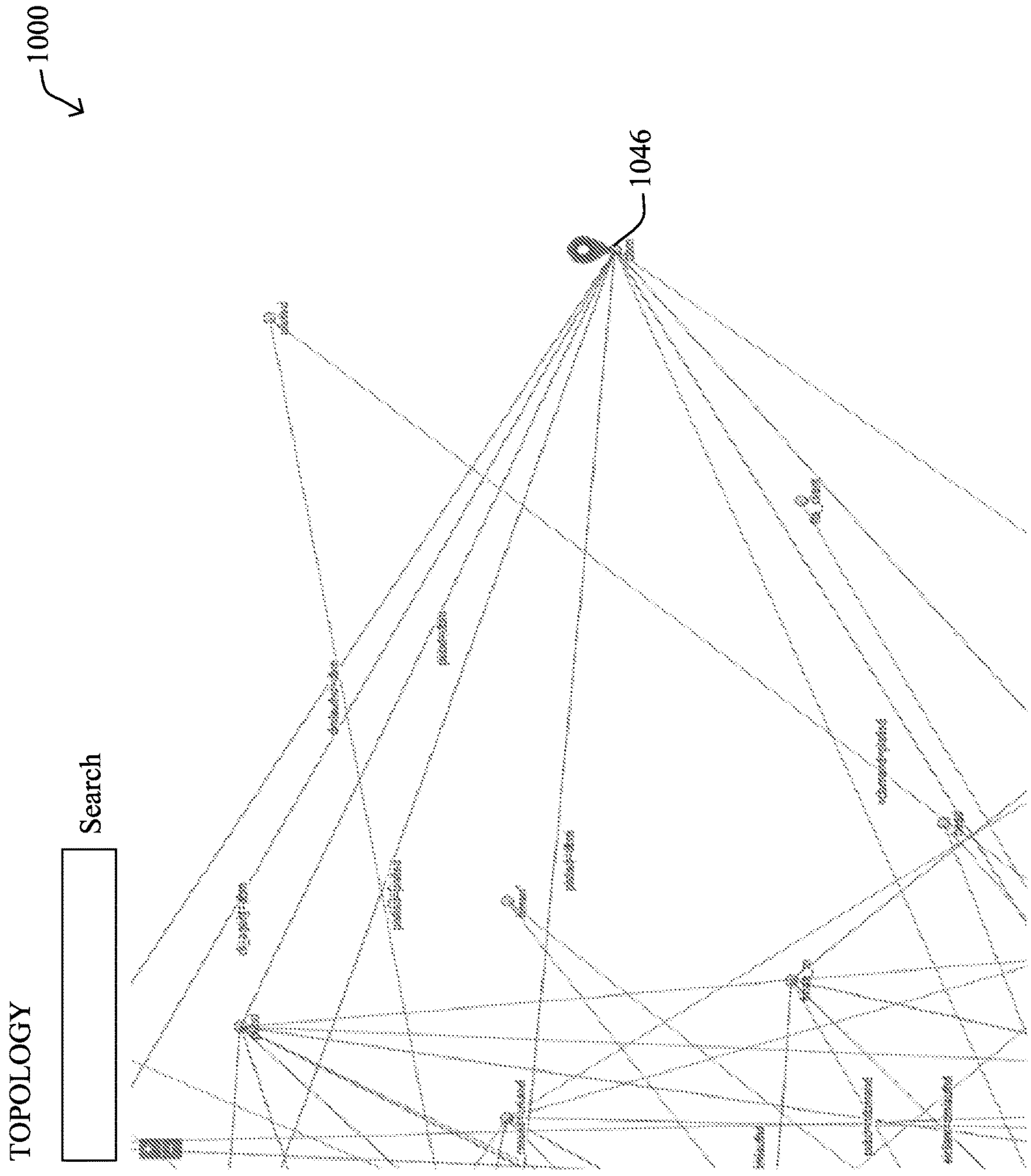
FIG. 10 illustrates an example artifact search within a web user interface.

FIG. 10 illustrates an example artifact search within a web user interface 1000. For example, within a complex operating system or network, a search capability to find the artifacts of interest may be beneficial. For example, in complex computing environments, it may not be feasible for a user to scroll around to find the processes of interest. Accordingly, implementations herein provide the ability to search for a particular artifact or process, for example by using the name of such an artifact or process.

For example, in FIG. 10, a search for a "dbm" process 1046 is conducted. In general, a user will type the name of the process (in this example, "dbm") into a search field and the graph will be automatically scaled within the web user interface 1000 to show the requested process. In some implementations, a flag or other identifier can be provided to highlight the requested process (e.g., the "dbm" process 1046).

Although implementations have been described herein in terms of network visualization, aspects of the present disclosure are not so limited. For example, the techniques herein can be applied to viewing other complex graphs, such as those that can arise in the context of full stack observability viewing the processes and IPC connections within an application stack, among others.

Figure 11:
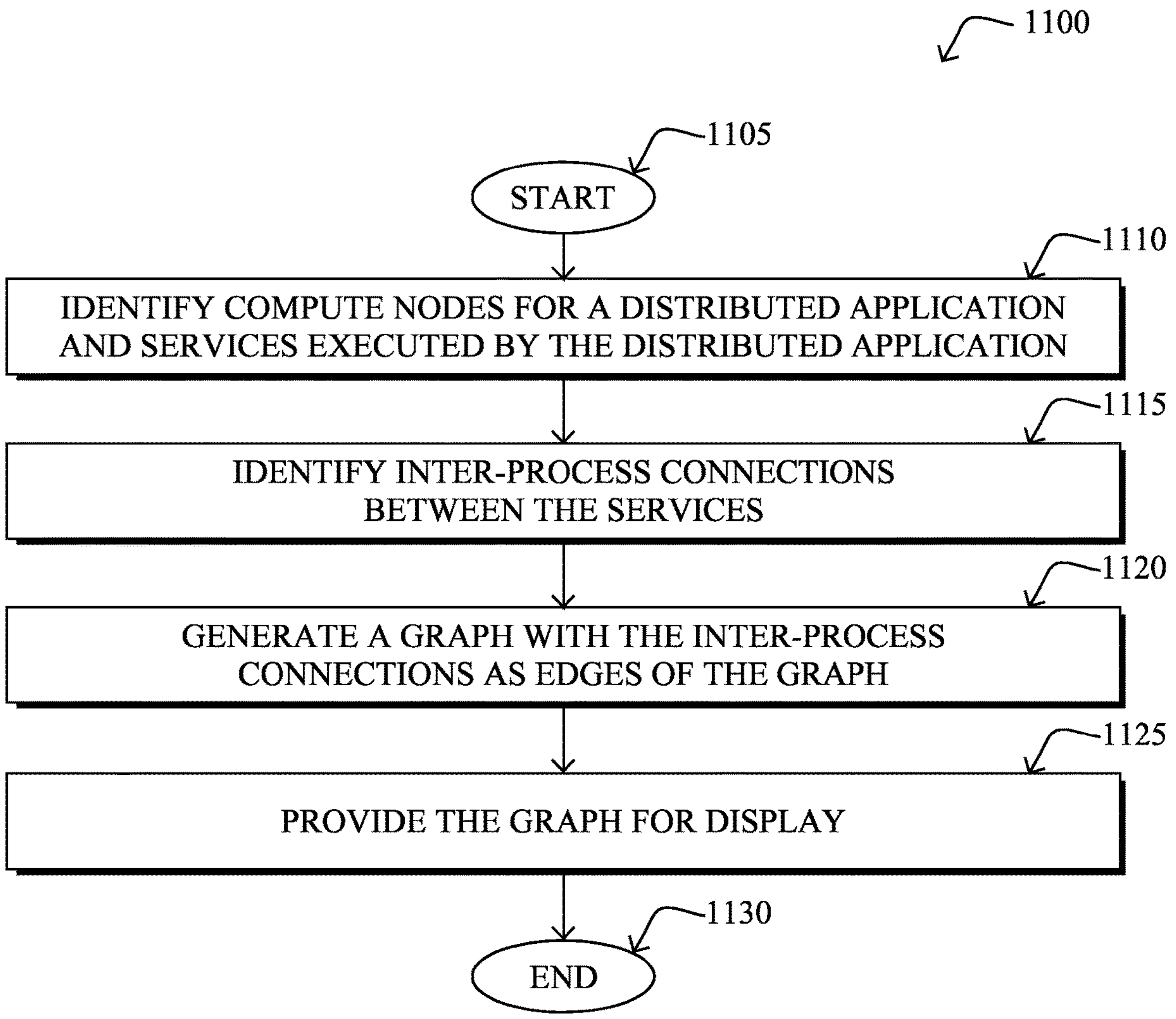
FIG. 11 illustrates an example simplified procedure for a framework for application observability.

FIG. 11 illustrates an example simplified procedure for a framework for application observability. For example, a non-generic, specifically configured device (e.g., device 200, or other apparatus) may perform procedure 1100 (e.g., a method) by executing stored instructions (e.g., application observability process 248). Alternatively, a tangible, non-transitory, computer-readable medium may have computer-executable instructions stored thereon that, when executed by a processor on a computer, cause the computer to perform a method according to procedure 1100.

Procedure 1100 may start at step 1105, and continues to step 1110, where, as described in greater detail above, a device identifies compute nodes for a distributed application and services executed by the distributed application. In various implementations, the compute nodes can be route processors, forwarding processors, and/or interface cards. In other implementations, the compute nodes can be virtual machines and/or operating system level virtualized computing instances (e.g., Linux containers).

At step 1115, as detailed above, the device identifies inter-process connections between the services.

At step 1120, as detailed above, the device generates a graph with the inter-process connections as edges of the graph. As discussed above, the graph may be generated in the backend (e.g., as part of performance of a backend operation). In addition, the graph may provide information to troubleshoot the compute nodes, processes, and/or IPC connections. Further, the graph may include geographical information associated with the compute nodes and, as a result, the processes and/or IPC connections associated with the compute nodes. Note also that the graph may be generated in a layout selected from a group consisting of: a force-directed graph layout; a radial graph layout; a circle packed graph layout; or a tree graph layout. The graph may also be generated according to a geographical JavaScript Object Notation (GeoJSON) format.

At step 1125, as detailed above, the device provides the graph for display. In some implementations, the graph is displayed in a single browser window or web page, for example, in a web UI. With the graph provided in a single web user interface window, the device can provide a mechanism to zoom in or out on the graph within the single web user interface window to alter an amount of detail visible on the graph. As described above, the graph can allow for visualization of at least ten thousand objects to be displayed in a single web user interface window.

As discussed above, the device can provide a mechanism to zoom in or out on the graph within a single web user interface window to alter an amount of detail visible on the graph. In such implementations, the mechanism to zoom in or zoom out the graph can provide a first zoom level provides a view of the compute nodes, a second zoom level provides a view of the services, a third zoom level provides a view of application services, a fourth zoom level provides a view of names of the services and the inter-process connections, and/or a fifth zoom level provides a heat map overlay.

In some implementations, the device can apply a desired layout algorithm to the services for a particular compute node around a center of a view of the graph. The device can the calculate a centroid for services of the particular compute node to generate a service reference point and translate coordinates for each service circle and IPC line edge to the particular compute node. In such implementations, the device can then center a reference point with the centroid for the services of the particular compute node.

Procedure 1100 then ends at step 1130.

It should be noted that while certain steps within procedure 1100 may be optional as described above, the steps shown in FIG. 11 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

The techniques described herein, therefore, provide an end-to-end web UI framework for application observability. By generating graphs for display by the web UI in the backend, aspects of the present disclosure allow for a massively (e.g., infinitely) scalable user experience for application service inspection and/or observability. Therefore, these techniques improve application service inspection and/or observability in comparison to contemporary approaches.

While there have been shown and described illustrative implementations that provide a framework for application observability, it is to be understood that various other adaptations and modifications may be made within the spirit and scope of the implementations herein. For example, while certain implementations are described herein with respect to using the techniques herein for certain purposes, the techniques herein may be applicable to any number of other use cases, as well. In addition, while certain types of scripting languages and common data formats are discussed herein, the techniques herein may be used in conjunction with any scripting language or common data format. Also, while certain configurations and layouts of graphical representations have been shown herein, other types not specifically shown or mentioned may also be used, and those herein are merely examples.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

What is claimed is:

1. A method, comprising:

identifying, by a device, compute nodes for a distributed application and services executed by the distributed application;

identifying, by the device, inter-process connections between the services;

generating, by the device, a graph with the inter-process connections as edges of the graph, the graph being structured for hierarchical visualization to enable comprehension of increasing numbers of processes and inter-process connections in a single interface, wherein a first zoom level provides a view of the compute nodes and at least one further zoom level provides, for a given one of the compute nodes, a view of the services executed by the distributed application on the given one of the compute nodes and inter-process connections between the services; and providing, by the device, the graph for display.

2. The method as in claim 1, wherein the compute nodes are selected from a group comprising: route processors, forwarding processors, or interface cards.

3. The method as in claim 1, further comprising:

providing the graph in a single web user interface window; and providing a mechanism to zoom in or out on the graph within the single web user interface window to alter an amount of detail visible on the graph.

4. The method as in claim 1, wherein the graph allows visualization of at least ten thousand objects to be displayed in a single web user interface window.

5. The method as in claim 1, wherein the graph is generated as a backend process.

6. The method as in claim 1, wherein the compute nodes comprise virtual machines.

7. The method as in claim 1, wherein the compute nodes comprise operating system level virtualized computing instances.

8. The method as in claim 1, wherein the graph provides information to troubleshoot the compute nodes.

9. The method as in claim 1, wherein the graph includes geographical information . . . associated with the compute nodes.

10. The method as in claim 1, wherein the graph is generated in a layout selected from a group comprising: a force-directed graph layout, a radial graph layout, a circle packed graph layout, or a tree graph layout.

11. The method as in claim 1, wherein the graph is generated according to a geographical JavaScript object notation (GeoJSON) format.

12. The method as in claim 1, further comprising:

providing a mechanism to zoom in or out on the graph within a single web user interface window to alter an amount of detail visible on the graph, wherein:

a second zoom level provides the view of the services, a third zoom level provides an application service graph for the services of the distributed application, and a fourth zoom level provides a view of names of the services and the inter-process connections.

13. The method as in claim 12, wherein:

a fifth zoom level provides a heat map overlay.

14. The method as in claim 1, further comprising:

applying, by the device, a desired layout algorithm to the services for a particular compute node around a center of a view of the graph;

calculating, by the device, a centroid for services of the particular compute node to generate a service reference point;

translating, by the device, coordinates for each service circle and inter-process connections line edge to the particular compute node; and centering, by the device, a reference point with the centroid for the services of the particular compute node.

15. A tangible, non-transitory, computer-readable medium having computer-executable instructions stored thereon that, when executed by a processor on a computer, cause the computer to perform a method comprising:

identifying compute nodes for a distributed application and services executed by the distributed application;

identifying inter-process connections between the services;

generating a graph with the inter-process connections as edges of the graph, the graph being structured for hierarchical visualization to enable comprehension of increasing numbers of processes and inter-process connections in a single interface, wherein a first zoom level provides a view of the compute nodes and at least one further zoom level provides, for a given one of the compute nodes, a view of the services executed by the distributed application on the given one of the compute nodes and inter-process connections between the services; and providing the graph for display.

16. The tangible, non-transitory, computer-readable medium as in claim 15, wherein the instructions are further executable to perform the method comprising:

providing the graph in a single web user interface window; and providing a mechanism to zoom in or out on the graph within the single web user interface window to alter an amount of detail visible on the graph.

17. The tangible, non-transitory, computer-readable medium as in claim 15, wherein the instructions are further executable to perform the method comprising:

providing a mechanism to zoom in or out on the graph within a single web user interface window to alter an amount of detail visible on the graph, wherein:

a second zoom level provides the view of the services, a third zoom level provides an application service graph for the services of the distributed application, and a fourth zoom level provides a view of names of the services and the inter-process connections.

18. The tangible, non-transitory, computer-readable medium as in claim 17, wherein the instructions are further executable to perform the method comprising:

a fifth zoom level provides a heat map overlay.

19. The tangible, non-transitory, computer-readable medium as in claim 15, wherein the graph provides information to troubleshoot the compute nodes.

20. An apparatus, comprising:

one or more network interfaces to communicate with a network;

a processor coupled to the one or more network interfaces and configured to execute one or more processes; and a memory configured to store a process that is executable by the processor, the process, when executed, configured to:

identify compute nodes for a distributed application and services executed by the distributed application;

identify inter-process connections between the services;

generate a graph with the inter-process connections as edges of the graph, the graph being structured for hierarchical visualization to enable comprehension of increasing numbers of processes and inter-process connections in a single interface, wherein a first zoom level provides a view of the compute nodes and at least one further zoom level provides, for a given one of the compute nodes, a view of the services executed by the distributed application on the given one of the compute nodes and inter-process connections between the services; and provide the graph for display.

* * * * *